F. WHEELER.
FURROW OPENER FOR SEEDING MACHINES.
APPLICATION FILED JULY 5, 1910.
1,056,386.
Patented Mar. 18, 1913.
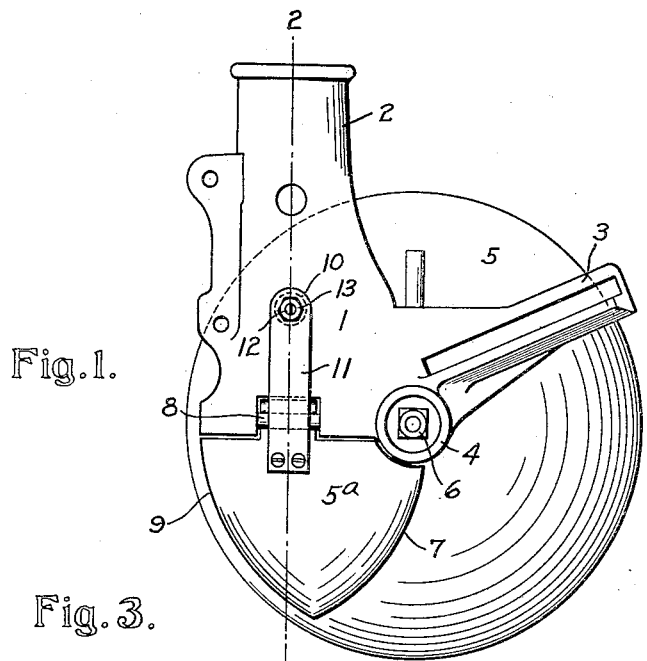
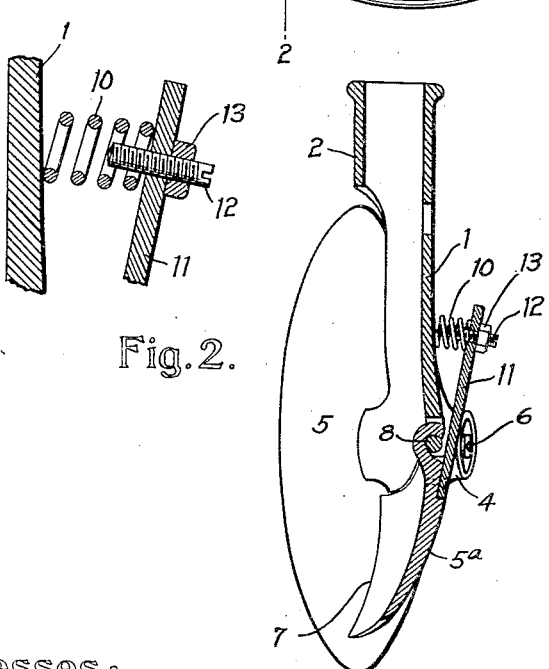
Witnesses:
D. Gurnee
C. W. Carroll
Inventor:
Frank Wheeler,
by his attorneys
Osgood, Davis & Dorsey

UNITED STATES PATENT OFFICE.

FRANK WHEELER, OF MOUNT MORRIS, NEW YORK, ASSIGNOR TO GENESEE VALLEY MANUFACTURING COMPANY, OF MOUNT MORRIS, NEW YORK, A CORPORATION OF NEW YORK.

FURROW-OPENER FOR SEEDING-MACHINES.

1,056,386.  Specification of Letters Patent.  Patented Mar. 18, 1913.

Application filed July 5, 1910. Serial No. 570,324.

*To all whom it may concern:*

Be it known that I, FRANK WHEELER, a citizen of the United States, and resident of Mount Morris, in the county of Livingston and State of New York, have invented certain new and useful Improvements in Furrow-Openers for Seeding-Machines, of which the following is a specification.

This invention relates to furrow openers of the disk type.

The object of the invention is to provide a shield or scraper for the disk that will lie close to it at all times even though the disk is misshaped or bent out of shape.

In the drawings: Figure 1 is a side elevation of a furrow opener equipped with this improvement; Fig. 2 is a section on the line 2—2 of Fig. 1; and Fig. 3 is an enlarged detail of Fig. 2.

The illustrated embodiment of the invention comprises a frame-casting 1 constituting a tube 2 through which seed is discharged from the machine, a bar 3 by which the machine is drawn and a bearing base 4 in which is fixed a stud 6 on which the disk 5 is journaled. For the purpose of keeping the furrow open for the reception of the seed, it has been customary to employ, with furrow openers of this type, a shield or scraper that extends down below the outlet of the seed-discharging tube, back of the point where the disk makes the furrow. In order to fulfil its functions satisfactorily it is essential that the shield shall contact along its front edge with the face of the disk, for otherwise weeds, sticks and other obstructions can wedge between the shield and disk, and not only prevent rotation of the disk but also disturb the furrow before the seed is deposited in it, and cause the seed to deflect from its course so that it falls outside of the furrow. But inasmuch as the disks used in these machines for opening the furrow are rarely if ever true, a stationary shield that fits snugly against one part of the side of the disk will stand out from the disk when the latter has been revolved upon its axis. It is to meet this difficulty that is the purpose of this invention.

In the illustrated device the disk 5 is dished, with its convex side toward the shield, and the shield 5ª is concave on its inner side, so as to form a space in which the seed can fall freely between the disk and shield. The shield is so hinged at 8 to the frame, preferably on a line drawn through the axis of the disk at right angles to the tube, that its forward edge 7 (which conforms to the contour of the convex side of the disk) can move to maintain its contact with the disk. For the purpose of holding the forward edge 7 of the shield against the outer surface of the disk 5 whatever the contour may be of that part of the disk that is opposite to it, a spring is employed. In the drawings a compressible coiled spring 10 is shown that is placed between the frame 1 and an arm 11 that is attached to and extends up from the shield. The arm 11 is thin enough to be somewhat resilient. The spring presses the shield yieldingly in against the disk with force sufficient to keep it always in contact with the disk, and permit it to move outwardly when it encounters bulges in the disk. This outward movement of the shield is limited, however, by means of an adjustable stop in the form of a screw 12 threaded in the arm 11 and adapted to engage the frame 1. This stop-screw is fixed in adjusted position by means of a nut 13.

In order to set the shield for a particular disk, the disk is rotated until the highest point on its convex surface comes beneath the edge 7 of the shield, the nut 13 and the set-screw 12 having first been loosened so that the shield is free to move outwardly under pressure of the disk. Next the set-screw 12 is turned down until its inner end bears against the frame 1, and the nut 13 is turned to lock the screw in this position. The screw now forms a stop to limit the movement of the shield outwardly from the disk against the action of the spring, so that it cannot normally be forced by sticks or other obstructions out beyond the position that it assumes when it encounters the said highest point on the disk surface. The resiliency of the arm, however, provides for further yielding under increased resistance, whereby breakage of the parts may be avoided in case of a particularly resistant obstruction entering between the shield and the disk.

I claim:—

1. The combination, with a furrow-opening disk, of a shield supported alongside said disk and movable toward and from the latter, means for yieldingly holding said shield against the disk; and an adjustable stop for limiting the outward movement of said shield; substantially as shown and described.

2. The combination, with a suitable frame, of a furrow-opening disk, a shield hinged in said frame adjacent to the disk and having a part projecting beyond the hinge, opposite the shield proper; and an adjustable stop carried by said part that projects from the shield and adapted to engage the frame to limit the outward movement of the shield; substantially as shown and described.

3. The combination, with a suitable frame, of a furrow-opening disk, a shield hinged in said frame adjacent to the disk and having a part projecting beyond the hinge, opposite the shield proper; an adjustable stop carried by the part that projects from the shield and adapted to engage the frame to limit the outward movement of the shield; and means for locking the stop in place; substantially as shown and described.

4. The combination, with a suitable frame, of a furrow-opening disk, a shield hinged in said frame adjacent to the disk and having a part projecting beyond the hinge, opposite the shield proper; an adjustable stop carried by the part that projects from the shield and adapted to engage the frame to limit the outward movement of the shield; and means for holding the shield yieldingly against the disk; substantially as shown and described.

5. The combination, with a suitable frame, of a furrow-opening disk journaled thereon, a shield pivotally mounted on the frame and provided with a resilient arm, an adjustable stop carried by the arm and adapted to engage the frame, and a spring connecting the arm and frame and acting to maintain the shield in engagement with the disk.

FRANK WHEELER.

Witnesses:
G. C. BRANCH,
J. A. STREETER.

---

Copies of this patent may be obtained for five cents each, by addressing the "Commissioner of Patents Washington, D. C."